I. E. PALMER.
BINDING POST FOR LOOSE LEAVES AND OTHER PURPOSES.
APPLICATION FILED JUNE 20, 1911.
1,009,556.
Patented Nov. 21, 1911.
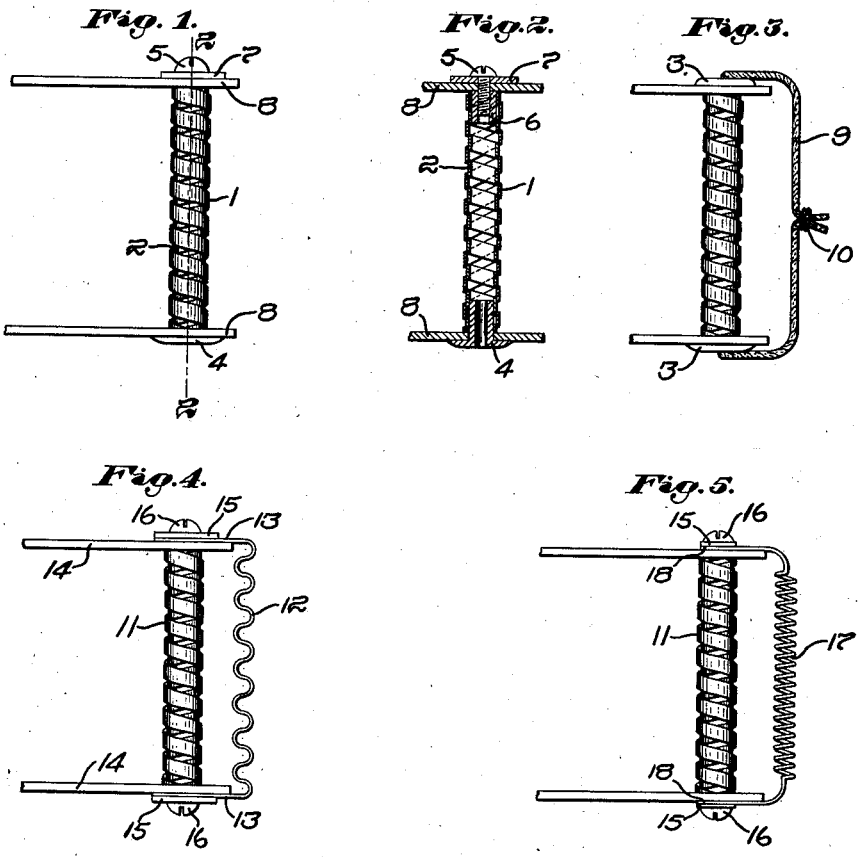

UNITED STATES PATENT OFFICE.

ISAAC E. PALMER, OF MIDDLETOWN, CONNECTICUT.

BINDING-POST FOR LOOSE LEAVES AND OTHER PURPOSES.

1,009,556.  Specification of Letters Patent.  Patented Nov. 21, 1911.

Application filed June 20, 1911. Serial No. 634,267.

*To all whom it may concern:*

Be it known that I, ISAAC E. PALMER, a citizen of the United States, and a resident of Middletown, in the county of Middlesex and State of Connecticut, have invented an Improvement in Binding-Posts for Loose Leaves and other Purposes, of which the following description, in connection with the accompanying drawings, is a specification, like characters on the drawings representing like parts.

This invention relates to binding posts for loose leaves and other purposes.

In order that the invention may be clearly understood, I have disclosed certain embodiments thereof in the accompanying drawing, wherein—

Figure 1 is a side elevation of one form of my invention; Fig. 2 is a vertical central section thereof; Fig. 3 is a side elevation showing a slightly modified form thereof; and Figs. 4 and 5 are side elevations of still further modifications thereof.

The binding post embodying my invention is adapted for use in binding or securing loose leaves of account books, memorandum books, catalogues and other papers. Obviously, however, the binding post is capable of use in other relations.

Referring first to that form of the invention shown in Figs. 1 and 2, the body of the post is indicated at 1, 2, it being composed of one or more, and herein two, helical or coiled springs 1, 2. Herein said springs are represented as right and left handed and of material elongated in cross section and substantially rectangular, it being evident, however, that any suitable material may be employed. If desired, more than two springs may be employed telescoped within each other. At each end, the said spring or springs are provided with heads or retainers, one of which is indicated at 3 as a short sleeve having a flange 4. Said sleeve is preferably rigidly secured, as by solder or otherwise, to the spring or springs. The head or retainer at the opposite end of the post is herein represented as composed of a screw 5 adapted to be tapped into a sleeve 6, which is itself preferably rigidly secured by solder or otherwise to the upper ends of the springs 1, 2. Between the head of the screw 5 and the sleeve 6, I interpose a masher 7 which may be integral with the screw 5, or be soldered thereto if desired, or it may be distinct therefrom and held in place between the head of the screw and said sleeve. The covers of a book in connection with which the binding post may be employed are represented at 8—8, the loose leaves or other material being received between said covers and suitably perforated for the reception of the post. The covers of the book or the loose leaves or other parts are held in place by the washer 7 and the flange 4 of the head or retainer 3.

The spring or springs 1, 2 are made of suitable spring metal such as steel. The post is therefore longitudinally expansible and contractible, thus permitting the addition of extra leaves as desired. Moreover, the post is readily and freely flexible laterally in every direction. In the longitudinal expansion or contraction of the springs of the post and in the lateral flexure thereof, the spires of the springs slide or move upon each other freely to accommodate themselves to the flexure or expansion or contraction of the post. In using that form of my invention shown in Figs. 1 and 2, the screw 5 and washer 7 are removed from the sleeve 6, after which the remainder of the post may be inserted through the perforations in the leaves or other articles. Thereupon the screw 5 and washer 7 are returned to place and bind the leaves together, as will be readily understood.

Instead of employing a screw 5 at one end of the post, I may employ heads or retainers 3 at each end thereof as indicated in Fig. 3, one of said heads being removable in any suitable manner, as by being threaded into a sleeve carried by one end of the spring or springs, indicated in Figs. 1 and 2. Or if desired, one of said heads may be merely confined or held by friction within the upper ends of the springs, in which case I preferably employ a cord 9 or the like passed through the post and having its ends knotted at 10, as shown in Fig. 3 wherein for the sake of clearness, that portion of the cord 9 passing through the post is not shown.

By the employment of telescoped springs, and particularly by the employment of telescoped reversely wound springs, I prevent the edges of the leaves from working their way between adjacent coils of the spring or springs. When but a single coiled spring is used, the leaves work their way between the coils.

It is obvious that in lieu of the heads or retainers shown in Figs. 1, 2 and 3, I may employ any other suitable means, one at least thereof being displaceable with respect to the body of the post, so as to permit said post body to be inserted through perforations in the leaves or the like.

In Fig. 4, I have illustrated a slightly modified form of my invention, wherein in addition to the main spring or springs 11 I employ a subsidiary expansible part 12, here shown as a plate spring of enlarged rectangular shape in cross section bent as indicated, so as to expand or contract with the expansion or contraction of the main spring 11. The ends 13 of said subsidiary spring may be confined between the covers 14 of the book by washers 15 and screws 16 which may be generally similar to the screw 5 and washer 7 shown in Fig. 1.

In that form of my invention shown in Fig. 5, I have substituted for the form of spring shown in Fig. 4, a subsidiary coil spring 17 preferably circular in cross section and having its ends bent into loops 18 confined between the washers 15 and screws 16 at one or both ends of the post.

It is obvious that other forms of subsidiary expansible elements may be employed, and that they may be attached in any suitable manner to the ends of the binding post.

Having thus described one illustrative embodiment of my invention, I desire it to be understood that although specific terms are employed, they are used in a generic and descriptive sense and not for purposes of limitation, the scope of the invention being set forth in the following claims.

1. A binding post for loose leaves and other purposes comprising in combination a plurality of telescoped coiled springs having sheet retaining means at each end the coils of said springs overlapping so as substantially to fill the spaces between the coils of the outer spring.

2. A binding post for loose leaves and other purposes comprising in combination inner and outer reversely wound coiled springs, and sheet retaining means for opposite ends thereof.

3. A binding post for loose leaves and other purposes comprising in combination inner and outer reversely wound coiled springs having a head fixed to one end thereof, a sleeve fixed to the opposite end thereof, and a screw tapped into said sleeve.

4. A binding post for loose leaves and other purposes comprising one or more springs coiled into tubular form, and heads applied to both ends thereof, in combination with a subsidiary expansible element extending in substantial parallelism with the axis of said spring or springs and detachably secured to the opposite ends thereof.

5. A binding post for loose leaves and other purposes comprising one or more springs coiled into tubular form, and retaining heads for both ends thereof, in combination with a subsidiary expansible element extending from end to end of said coiled spring or springs and detachably secured to said spring or springs.

In testimony whereof, I have signed my name to this specification, in the presence of two subscribing witnesses.

ISAAC E. PALMER.

Witnesses:
 FRED. E. FOWLER,
 THOS. W. HALLORAN.